Jan. 31, 1956

A. J. CARPENTER 2,732,570

ADJUSTABLE PIPE FITTING CLAMP CONSTRUCTION
FOR TAPPING MACHINE

Filed Dec. 29, 1951

INVENTOR.
Albert J. Carpenter

Frease, Bishop & Hamilton
ATTORNEYS

INVENTOR.
Albert J. Carpenter
BY
Frease, Bishop & Hamilton
ATTORNEYS

Jan. 31, 1956  A. J. CARPENTER  2,732,570
ADJUSTABLE PIPE FITTING CLAMP CONSTRUCTION
FOR TAPPING MACHINE
Filed Dec. 29, 1951  5 Sheets-Sheet 3

INVENTOR.
Albert J. Carpenter
BY
Frease, Bishop & Hamilton
ATTORNEYS

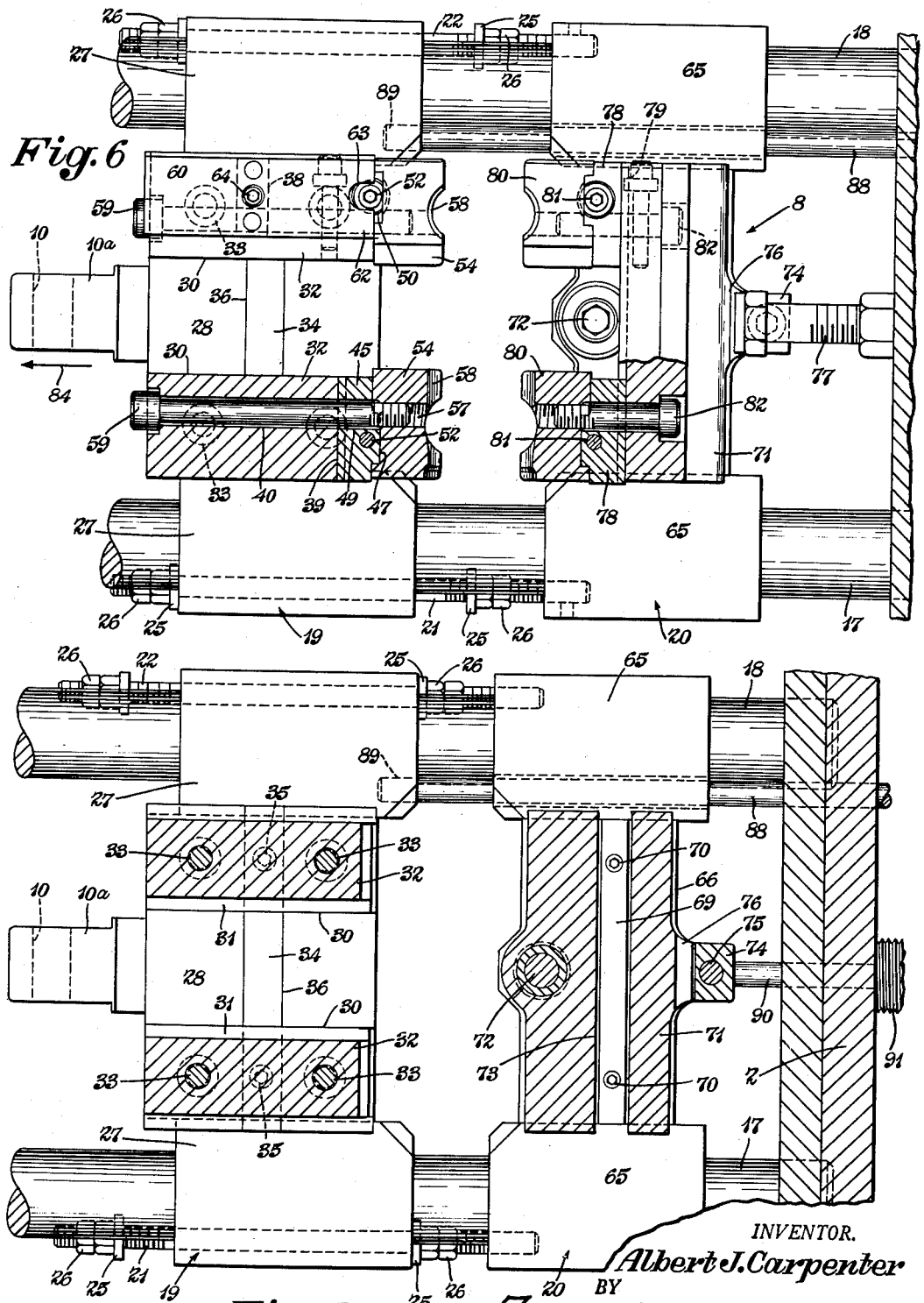

INVENTOR.
Albert J. Carpenter
BY
Frease, Bishop & Hamilton
ATTORNEYS

United States Patent Office 2,732,570
Patented Jan. 31, 1956

2,732,570
ADJUSTABLE PIPE FITTING CLAMP CONSTRUCTION FOR TAPPING MACHINE

Albert J. Carpenter, Canton, Ohio, assignor to The Cleveland Tapping Machine Company, Canton, Ohio, a corporation of Ohio Application December 29, 1951, Serial No. 264,154

9 Claims. (Cl. 10—107)

The invention relates to tapping machines and more particularly to a clamping, gripping or vise-like mechanism constituting the work holding means of a tapping machine which simultaneously taps two or more openings in each of a plurality of work pieces, such as pipe fittings, electrical fittings, valves and the like.

In the manufacture of pipe fittings such as L's, T's and the like, it is necessary to form internal threads in each opening of the fitting and to maintain squareness of the threaded openings with respect to one another. Such fittings usually are made as malleable castings and the threaded openings are tapped directly in the rough castings.

It is desirable, in order to reduce the expense of and time consumed in performing the tapping operation, to use high surface cutting speeds, to tap the threads in all of the openings of a plurality of fittings at one time, and to continuously perform such operations successively on pipe fittings and the like, two at a time in cycled operation.

A multiple spindle tapping machine in which spindle rigidity may be maintained to permit high surface cutting speeds to be used and proper thread form and thread squareness maintained in continuously successively tapping the openings in a plurality of fittings during cycled operation of the tapping machine is diclosed in my copending application entitled Pipe Fitting Tapping Machine, filed December 21, 1951, Serial No. 262,767.

In order to provide for continuous cycled operation of such a tapping machine, it is necessary to provide a clamping or gripping jaw or vise-like mechanism which opens at a loading station to receive a plurality of untapped fittings at one time from feed magazines, then advances the untapped fittings thus received from the feed magazines to a tapping station and closes to rigidly hold the fittings in proper position for tapping all of the openings in the fittings at the tapping station simultaneously, and then releases and discharges the fittings and returns to the loading station for receiving another set of fittings from the feed magazines.

These operations present a complicated problem because of the short time cycle involved from the time one set of fittings is tapped at the tapping station until the next set of fittings is tapped at said station during continuous cycled operation of the tapping machine; and because of the necessity of rigidly and accurately holding the fittings at the tapping station during tapping so that proper thread form and squareness results in the tapped fittings.

In prior pipe fitting tapping machines fittings have been tapped one at a time on a two spindle machine in the case of an L, or on a three spindle machine in the case of a T. While the construction of clamping devices used as work holders in such prior machines does not present any serious mechanical or operating problem because only one fitting is involved in each instance, nevertheless the construction of prior clamping devices for such machines has been somewhat complicated, has involved the use of dove-tailed connections and complicated clamping members for holding the component parts of the work holder in adjusted position, has presented problems in maintaining jaw adjustment when it is necessary for any reason to change the jaw like elements containing the work engaging surfaces, and has been difficult to adjust for holding the work or untapped pipe fittings in proper position with relation to a plurality of tapping spindles which perform the tapping operation on the untapped fittings held by the clamping device at the tapping station.

These problems are further complicated by the necessity of providing for multiple piece tapping of fittings of different sizes requiring different sets of jaw or work engaging elements for the clamping mechanism for each fitting size.

Accordingly, it is a general object of the present invention to provide a new work holder clamping device for a multiple spindle tapping machine operable to receive a plurality of untapped fittings from a feed magazine at a loading station and to advance the same to and hold them in exact location at a tapping station during tapping in continuous automatic cycled operation of the tapping machine.

Furthermore, it is an object of the present invention to provide a new work holder clamping device for a multiple spindle tapping machine in which jaw adjustment can be maintained while the work engaging or jaw elements of the device are changed, either for replacement or for fitting size change.

Moreover, it is an object of the present invention to provide a new work holder clamping device for a multiple spindle tapping machine in which the necessity of using dove-tailed joints and complicated clamping elements in the assembly of the clamping device is avoided.

Also, it is an object of the present invention to provide a new work holder clamping device for a multiple spindle tapping machine adapted for holding two pipe fittings at a time, in which adjustments can be readily, quickly and easily made to properly align the openings of the untapped fittings to be tapped at a tapping station with the tapping machine spindles.

Furthermore, it is an object of the present invention to provide a new multiple fitting clamping device for a multiple spindle tapping machine, in which the work engaging jaw elements may be adjusted to align the untapped openings of the pipe fittings clamped thereby with the tapping machine spindles, and in which the clamping device is movable between a loading station and a tapping station and opens and closes, respectively, during movement from and to the tapping station, and in which the opening and closing movement is adjustable to accommodate various sized pipe fittings.

Likewise, it is an object of the present invention to provide a new multiple fitting clamping device for a multiple spindle tapping machine in which equalizing means is provided between the plurality of work engaging jaw elements to compensate for the inevitable slight size differences in cast pipe fittings being tapped during continuous automatic operation of the tapping machine.

Also, it is an object of the present invention to provide a new work holder clamping device for a multiple spindle tapping machine which machine simultaneously taps at least two openings in each of at least two work pieces such as pipe fitting L's and T's at one time and at high surface cutting speeds.

Likewise it is an object of the present invention to provide a new work holder clamping device for a multiple head tapping machine which permits increased machine output and reduced tapping operation expense in the automatic cycled operation of a tapping machine for tapping the openings in pipe fittings, electrical fittings, valves and the like.

Finally, it is an object of the present invention to solve problems existing in the art of tapping machine construction and operation, to eliminate prior art difficulties in the construction of work holder devices for tapping machines, to generally improve the construction, adjustment and operation of tapping machine work holders, and to obtain the foregoing advantages and desiderata in a simple and effective manner.

These and other objects and advantages apparent to those skilled in the art from the foregoing description and claims may be obtained, the stated results achieved, and the described difficulties overcome by the apparatus, combinations, sub-combinations, constructions, parts, elements and arrangements which comprise the present invention, the nature of which is set forth in the following general statement, a preferred embodiment of which— illustrative of the best mode in which applicant has contemplated applying the principles—is set forth in the following description and shown in the drawings, and which are more particularly and distinctly pointed out and set forth in the appended claims forming part hereof.

The nature of the improvements in tapping machine work holder construction of the present invention may be stated in general terms as including in a tapping machine having a plurality of spindles for tapping a plurality of openings in a plurality of pipe fittings at one time at a tapping station and having feed magazines for feeding a plurality of untapped fittings to a loading station of the machine at one time, a plurality of slide members, front and rear carriers reciprocable on the slide members and movable relative to each other, means for moving the carriers in either direction on the slide members and relative to each other, a rear jaw block on the rear carrier, a plurality of front jaw blocks on the front carrier, jaw adjusting blocks slidably mounted for movement in one direction on the front and rear jaw blocks, means for adjusting the relative locations of the jaw adjusting blocks with respect to the front and rear jaw blocks, a work engaging jaw element slidably mounted on each jaw adjusting block for movement in a direction angular to the direction of movement of such jaw adjusting block on the front or rear jaw blocks, means for adjusting each work engaging jaw element with respect to its jaw adjusting block, means for rigidly clamping in adjusted position the work engaging jaws and jaw adjusting blocks to their respective front or rear jaw blocks, said rear jaw block being pivotally mounted on said rear carrier to permit equalized clamping of the work engaging jaw elements on a plurality of fittings clamped thereby at the tapping station, stop means limiting pivotal movement of said rear jaw block on said rear carrier, adjustable stop means for the rear carrier, restraining clamp means for the rear jaw block, and work locating means carried by the front jaw blocks.

By way of example, the improved work holder clamping device of the present invention is shown in the accompanying drawings forming a part hereof, wherein:

Fig. 6 is a view similar to Fig. 2, with parts broken away and in section, showing the jaws open and the parts moving toward the loading station;

Fig. 7 is a plan sectional view taken on the line 7—7, Fig. 3;

Similar numerals refer to similar parts throughout the drawings.

Figure 1:
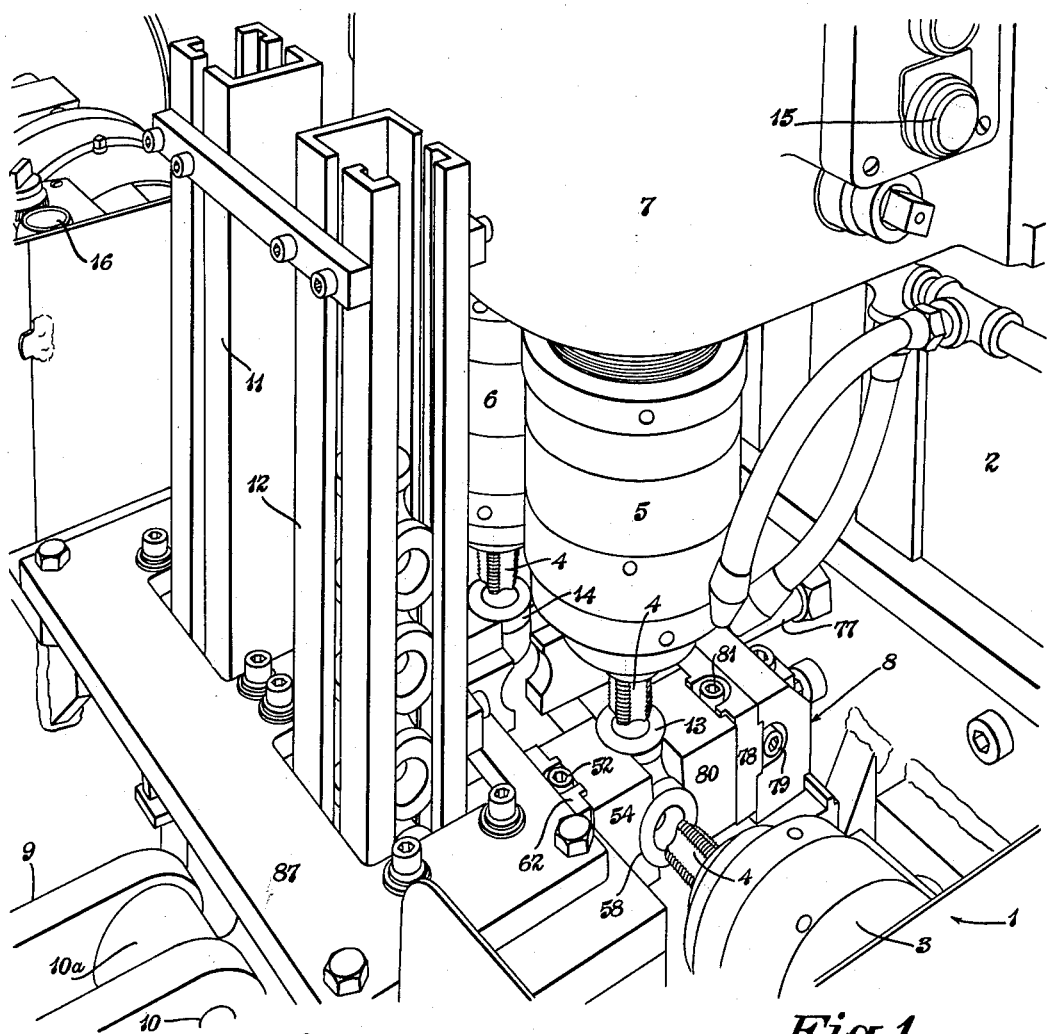
Figure 1 is a fragmentary perspective view illustrating a work holder clamping device for a tapping machine incorporating the improvements of the present invention.

A four spindle tapping machine incorporating the improvements of the present invention is generally indicated at 1 in Fig. 1. The tapping machine 1 includes a rear vertical column 2 extending upward from the rear of a base member. Mounted on top of the base member is a righthand spindle housing and assembly generally indicated at 3 provided with a tapping tool 4. A similar lefthand spindle housing having a similar tapping tool is also mounted on the base member. Two vertical spindles 5 and 6 are mounted in a combined spindle housing 7 on column 2, each spindle being equipped with a tapping tool 4. Each of the spindles is motor-driven and is adapted for longitudinal movement for performing a tapping operation.

In accordance with the present invention a multiple work holder generally indicated at 8 is provided for reciprocating movement toward and away from column 2, between the horizontal spindles and below vertical spindles 5 and 6, and the work holder 8 is operated by levers 9 pivotally connected at 10 to an arm 10a connected with work holder 8. The levers 9 are operated by a cylinder (not shown) to impart reciprocating movement to the work holder 8.

Work feed magazine slides 11 and 12 also are mounted on the base member of the tapping machine and the magazines 11 and 12 are charged with pipe fittings, such as L's, as shown in Fig. 1, which are fed downward in the magazines, two at a time side by side, to the reciprocating work holder 8. The work holder 8 receives the fittings to be tapped, two at a time, at a loading station, and advances them from the loading station to the tapping station, as shown in Fig. 1, where one L 13 on the righthand side is located with one opening beneath spindle 5 and the other opening to the left of spindle 3, and so that the other L 14 on the lefthand side is located with one opening beneath spindle 6 and the other opening to the right of the other horizontal spindle.

When the two fittings 13 and 14 have been so located by work holder 8, the four spindles advance toward and tap the fittings simultaneously, then retract, and the work holder discharges the tapped fittings and moves from the tapping station back to the loading station to receive another pair of untapped fittings from the feed magazines 11 and 12.

The tapping machine 1 is provided with usual electrical timing, sequence and cycle control mechanisms which may be actuated to operate the machine continuously, or one cycle at a time, selectively, by operation of usual machine control buttons, some of the same being generally indicated at 15 and 16. The tapping machine 1 above described thus may be used to simultaneously tap two openings in each of two L's in continuous operation.

The improvements of the present invention which provide a multiple work holder permitting the above described operation of a tapping machine to be obtained relate primarily to the construction and arrangement of the work holder 8, the details of which are illustrated in Figs. 2 through 9.

Referring first to Figs. 2, 3, 6 and 7, the improved multiple work holder construction includes two spaced horizontally extending slide members 17 and 18. Front and rear carriers 19 and 20 are reciprocable on the slide members 17 and 18 and are movable relative to each other by imparting movement to the arm 10a from levers 9 and the operating cylinder therefor.

Figure 2:
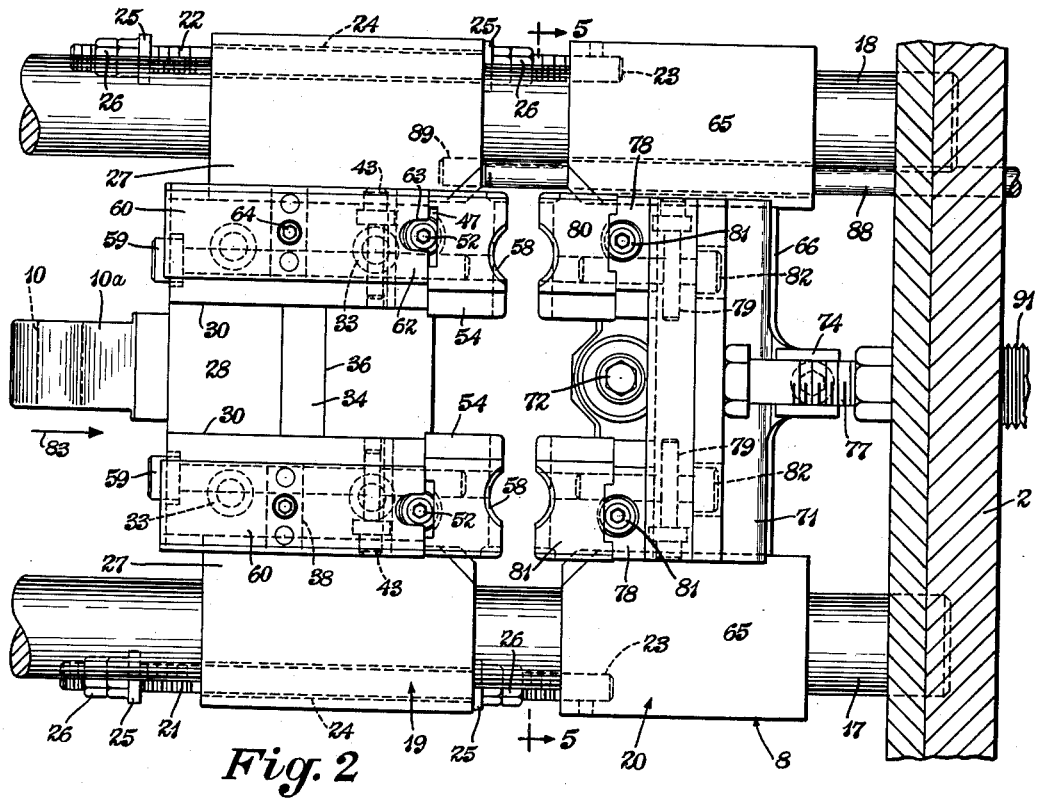
Fig. 2 is a top plan view of the improved clamping device showing the parts in closed position at the tapping station.

The relative movement between carriers 19 and 20 may be adjusted and controlled by means engageable between the front and rear carriers. As best seen in Figs. 2, 3, 6 and 7, such means includes control rods 21 and 22 which are mounted at one end 23 (Figs. 2 and 3) on carrier 20 and extend through openings 24 in carrier 19. Spaced stop members 25 are provided on control rods 21 and 22 for longitudinal adjustment thereon, and the stop members 25 may be locked in adjusted positions by lock nuts 26. Thus, the carriers 19 and 20 may move relative to one another between the two relative positions thereof shown in Figs. 2 and 6, Fig. 2 illustrating a so-called "closed" position and Fig. 6 an "open" position.

The front carrier 19 preferably includes spaced slide portions 27 which are slidable on slide members 17 and 18 and a mounting portion 28 extending between the slide portions 27 and having a downwardly extending flange portion 29 also extending between the slide portions 27. The front carrier 19 may be formed or machined as one piece, or the several portions 27, 28 and 29 thereof may be formed separately and welded together, as illustrated in Fig. 8.

Spaced grooves 30 are formed in the top of carrier mounting portion 28 extending longitudinally parallel to the slide members 17 and 18 for receiving the bases 31 of righthand and lefthand front jaw blocks generally indicated at 32.

Figure 3:
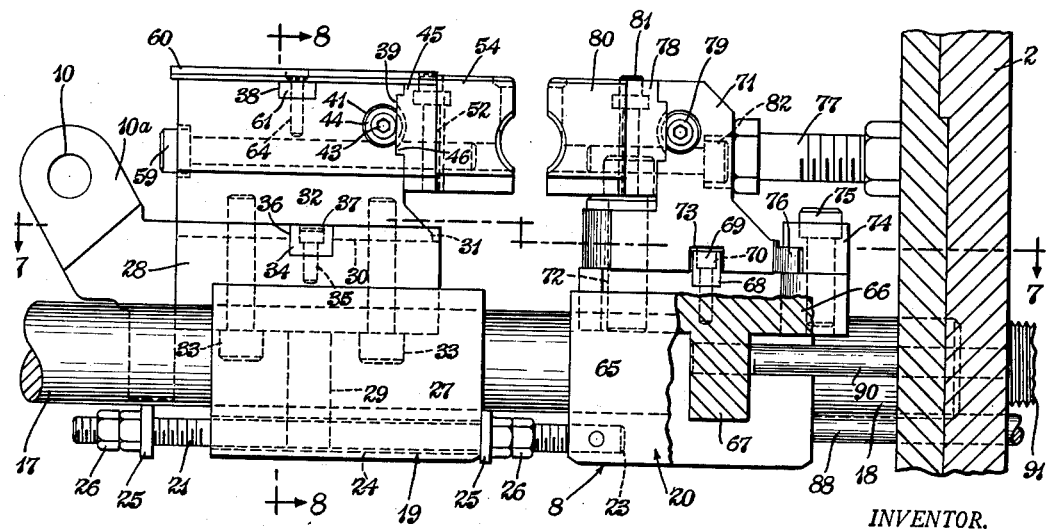
Fig. 3 is a side elevation, with certain parts broken away and in section, of the clamping device shown in Fig. 2.
Figure 4:
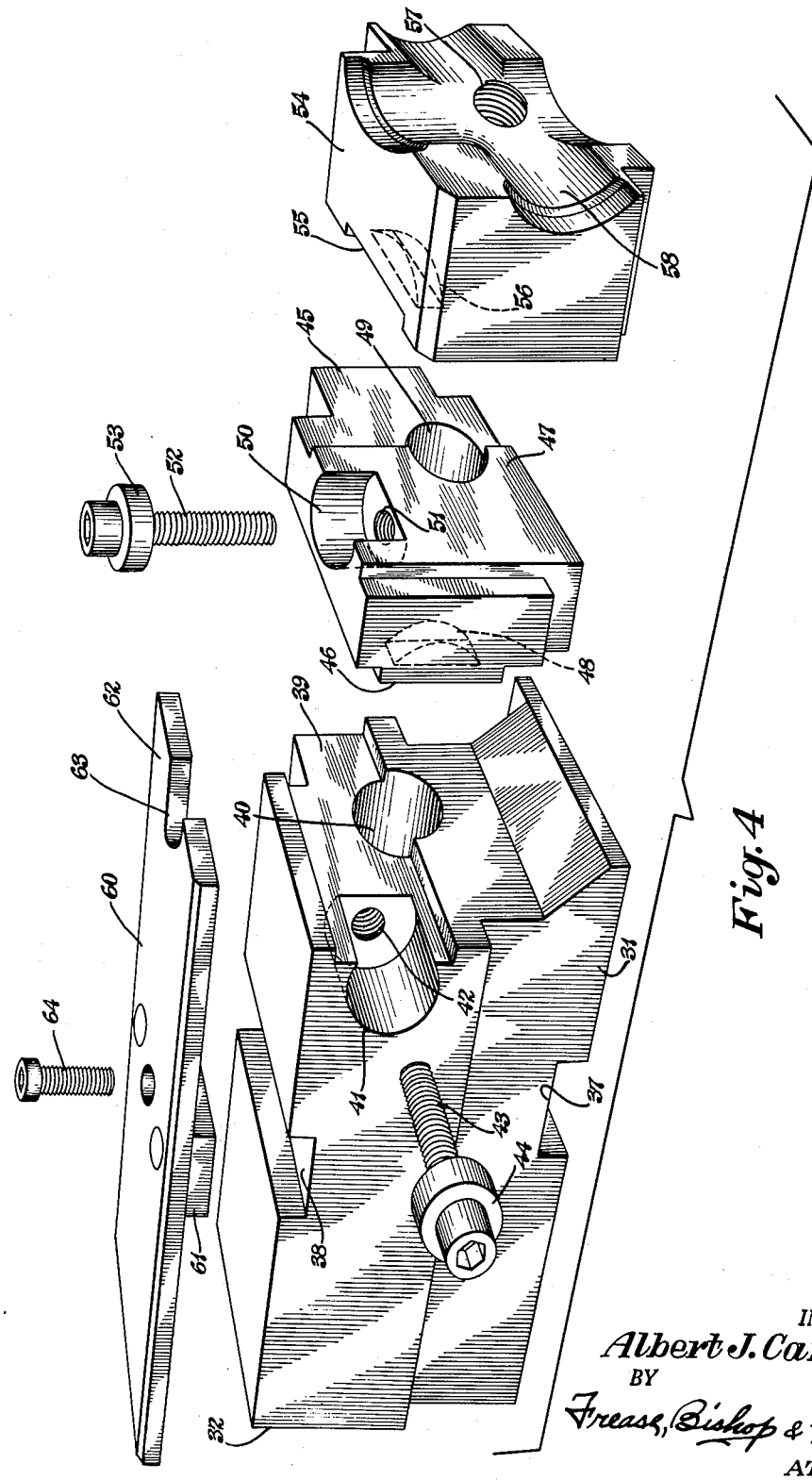
Fig. 4 is an exploded perspective view of elements of one of the front work engaging jaw elements and its adjusting and mounting blocks.

The jaw blocks 32 are each bolted by bolts 33 to the mounting portion 28 of front carrier 19 and a cross key member 34 also may be secured to the carrier mounting portion 28 by bolts 35. The key member 34 extends in a keyway 36 formed crosswise in the carrier mounting portion 28 and also extends in keyways 37 formed crosswise in the bottom portion of each jaw block 32 (Figs. 3 and 4). Thus, the front jaw blocks 32 are rigidly mounted and accurately located on the front carrier 19.

Figure 8:
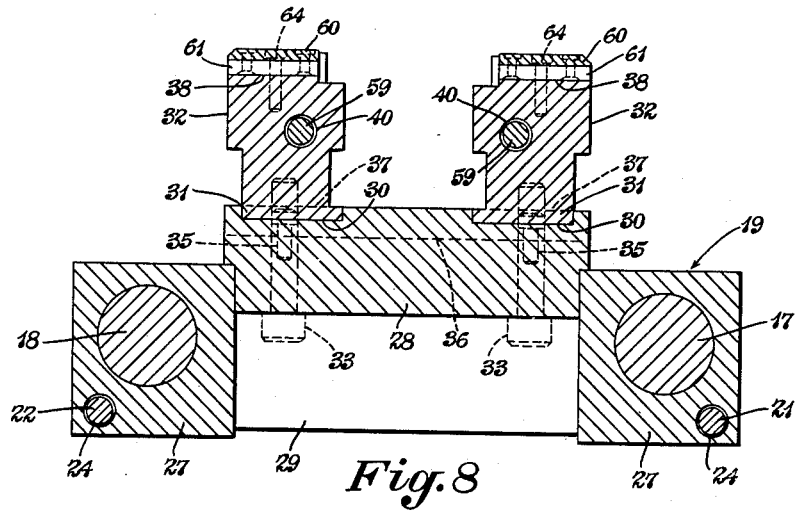
Fig. 8 is a section through the front carrier taken on the line 8—8, Fig. 3.

Referring particularly to Figs. 3, 4 and 8, the front jaw blocks 32 are formed as similar right and lefthand members, the construction of the righthand or lower block viewing Fig. 2, being clearly illustrated in Fig. 4. Each front jaw block 32 is also formed with an upper cross keyway 38 and a front cross slideway 39. A through opening 40 extends longitudinally centrally through each front jaw block 32 and a cross counterbore 41 communicating with the slideway 39 and tapped hole 42 is formed in one corner of each front jaw block 32 for receiving a threaded adjusting member 43 having an adjusting collar 44 thereon.

A jaw adjusting block 45 is slidably mounted crosswise on one end of each jaw block 32, the jaw adjusting blocks 45 also being formed as similar right and lefthand members. Each adjusting block 45 is provided on one vertical face with a cross slide projection 46 and on its other vertical face with a vertical slide projection 47. The cross slide projection 46 is received in jaw block slideway 39, and adjacent the counterbore 41 a recess 48 is formed in slide projection 46 for receiving the collar 44 of adjusting screw 43. Each jaw adjusting block 45 also has a through opening 49 which is adapted to be generally aligned with the opening 40 in jaw block 32 when slide projection 46 is engaged in slideway 39. When the parts are so assembled, the adjusting block 45 may be adjusted crosswise with respect to the jaw block 32 by rotation of the adjusting screw 43.

A counterbore 50, similar to counterbore 41, is formed in the upper face of adjusting block 45 communicating with tapped hole 51 and intersecting with vertical slide projection 47. An adjusting screw 52 provided with a projecting collar 53 is received in tapped hole 51.

A work engaging jaw element 54 is slidably mounted for vertical movement on one end of each jaw adjusting block 45, the work engaging jaw elements also being formed as similar right and lefthand members. Each work engaging jaw element 54 is provided on one vertical face with a vertical slideway 55 which receives the vertical slide projection 47 of jaw adjusting block 45. A recess 56 is formed in slideway 55 adjacent the counterbore 50 of jaw adjusting block 45 for receiving the collar 53 of adjusting screw 52. Each work engaging jaw element 54 also has a tapped opening 57 which is adapted to be generally aligned with the openings 40 and 49 in jaw block 32 and jaw adjusting block 45 when slide projection 47 is engaged in slideway 55. When the parts are so assembled, the work engaging jaw element 54 may be adjusted vertically with respect to the jaw adjusting block 45 by rotation of the adjusting screw 52.

The work engaging face of element 54 is formed as indicated at 58 with the general configuration of the pipe fitting to be clamped thereby. When the parts are assembled, as described, and the jaw adjusting block 45 and work engaging element 54 are positioned at proper adjusted position by adjustment of screws 43 and 52, the parts may be rigidly clamped in such adjusted position by bolt 59 (Fig. 6) which extends through the enlarged aligned openings 40 and 49 and is threaded into the tapped openings 57 in the work engaging jaw element 54.

A slide plate 60 having a cross projection 61 on its bottom surface is secured to the top of jaw block 32 with projection 61 engaged in keyway 38, and with one end 62 thereof overlapping the upper end of jaw adjusting block 45. The slide plate 60 is notched at 63 to provide access to adjusting screw 52 and the top surface of slide plate 60 is flush with the top surface of work engaging jaw element 54. A bolt 64 may be used to secure the slide plate 60 to the jaw block 32.

Figure 5:
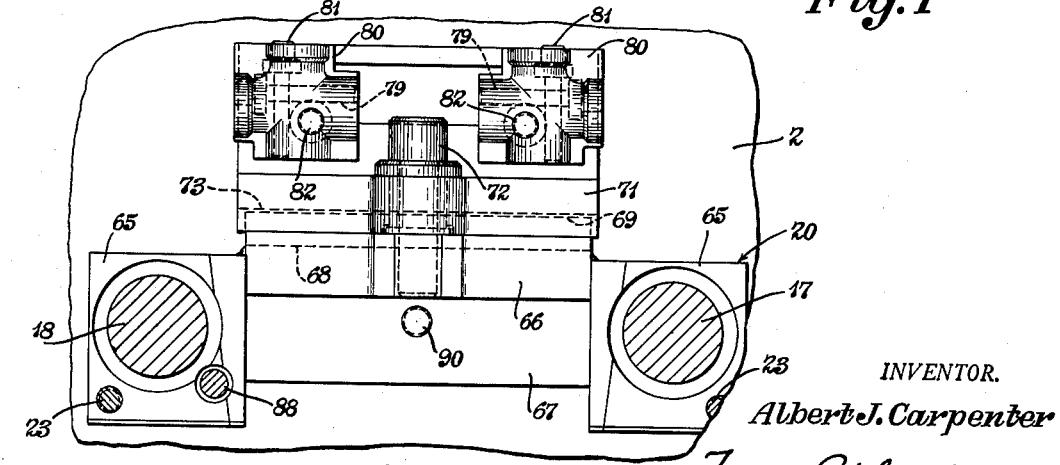
Fig. 5 is a sectional view looking in the direction of the arrows 5—5 of Fig. 2.

The rear carrier 20 preferably includes (Fig. 5) spaced slide portions 65 which are slidable on slide members 17 and 18 and a mounting portion 66 extending between the slide portions 65 and having a downwardly extending flange portion 67 also extending between the slide portions 65. The rear carrier 20 may be formed or machined as one piece, or the several portions 65, 66 and 67 thereof may be formed separately and welded together, as illustrated in Fig. 5. A cross groove 68 is formed in the top of carrier mounting portion 66 in which a key member 69 is located, bolted by bolts 70 to the carrier mounting portion 66.

A rear jaw block 71 is pivotally mounted at 72 on the rear carrier 20, pivotal movement in each direction being limited by engagement of the enlarged cross groove 73 (Fig. 3) with key 69. A restraining clamp 74 is bolted at 75 to the rear carrier 20 engaging with a sliding fit with lug 76 formed on the rear jaw block 71 to prevent tilting of the jaw block 71 when the rear carrier 20 reaches the limit of its movement toward column 2 by engagement with adjustable stop member 77.

Two jaw adjusting blocks 78 are slidably mounted crosswise on rear jaw block 71 in the same manner that the jaw adjusting blocks 45 are mounted on front jaw blocks 32 and each jaw adjusting block 78 may be adjusted by an adjusting screw 79.

A work engaging jaw element 80 is vertically slidably mounted on and vertically adjustable by adjusting screw 81 on each jaw adjusting block 78 in a manner similar to the mounting of work engaging jaw elements 54 on jaw adjusting blocks 45. The jaw adjusting blocks 78 and work engaging jaw elements 80 may be clamped in adjusted position on rear jaw block 71 by bolts 82 which function in a manner similar to bolts 59.

In initially setting up the improved work holder construction, the jaw adjusting blocks 45 and 78 and the work engaging jaw elements 54 and 80 are adjusted so that when the parts are in the position shown in Figs. 1, 2 and 3 at the tapping station, the two pipe fittings 13 and 14 will be accurately clamped and rigidly held with the fitting openings in proper alignment with the tapping tools 4 of the four tapping spindles of the tapping machine. The movement of the rear carrier 20 is stopped when the fittings 13 and 14 have reached proper position at the tapping station by adjustable stop member 77. If it happens, due to the inevitable presence of slight dimensional variations in the size of fittings 13 and 14 to be tapped, that one fitting is slightly larger than the other, this dimensional variation is compensated for by the equalizing pivotal mounting 72 of the rear jaw block 71 on rear carrier 20.

The fittings 13 and 14 are, of course, clamped between the work engaging jaw elements 54 and 80 during movement to and while at the tapping station by the pressure transmitted in the direction of the arrow 83 (Fig. 2) from the levers 9 which move the work holder 8 in the direction of the arrow 83 on slide members 17 and 18 to the position shown in Fig. 2 which constitutes the position of the parts at the tapping station illustrated in Fig. 1. The relative location of the carrier members 19 and 20 when fittings are being clamped thereby to provide the proper clamping pressure by the jaw elements 54 and 80 is attained by adjustment of the righthand stop members 25, as shown in Figs. 2 and 3.

After the two fittings have arrived at the tapping station as indicated in Fig. 1, and after the tapping tools 4 have been operated to tap the openings in the two L's 13 and 14, the levers 9 operate through arm 10a to move the work holder 8 in the direction of the arrow 84 of Fig. 6. Initially on such movement, the front carrier 19 slides on slide members 17 and 18 to the left, viewing Fig. 6, while the rear carrier remains stationary thus opening up the work engaging jaw elements 54 and 80 and permitting the tapped fittings to drop to work discharge means, not shown. After a predetermined opening movement of the front carrier 19, it engages the lefthand stop members 25 (Fig. 6) at which time the rear carrier 20 also moves in the direction of the arrow 84 on slide members 17 and 18 in unison with the front carrier 19 until the open jaw elements 54 and 80 are located at the loading station below the feed magazines 11 and 12.

Meanwhile, the lowermost pair of untapped fittings at the feed magazines 11 and 12 have been supported on slide plates 60 during movement of the work holder 8.

As the work holder arrives at the loading station, the lowermost pair of untapped fittings at the feed magazines 11 and 12 drop to positions between the open jaws 54 and 80, and further movement of the work holder 8 in the direction of the arrow 84 is arrested. The work holder 8 is then moved in the direction of the arrow 83, the front carrier 19 first moving on slide members 17 and 18 in the direction of the arrow 83 until the fittings are clamped between the jaw elements 54 and 80.

Figure 9:
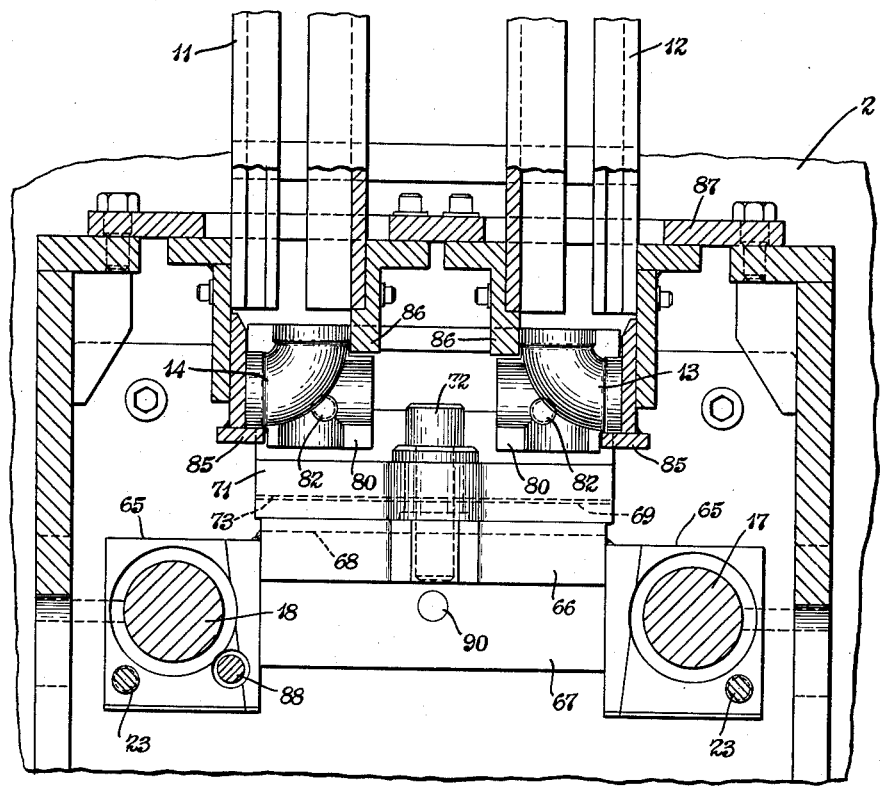
Fig. 9 is a section through the feed magazines showing work locating devices which cooperate with the improved clamping device.

Meanwhile, the fittings are held in proper location to be clamped, by the fingers 85 and 86 which are mounted on the base plate 87 which supports the feed magazines 11 and 12, as shown in Fig. 9.

A rod 88 may be connected at one end 89 with the front carrier 19 and the rod 88 extends through the column 2 to actuate limit switch means, not shown, in the time, sequence and cycle control mechanisms provided for the automatic operation of the tapping machine. Likewise, another rod 90 (Fig. 3) may be connected with the rear carrier 20 to extend through the column 2 to a friction device 91 which prevents over-travel of the rear carrier 20 in the direction of the arrow 84 when movement of the work holder 8 is arrested and reversed at the loading station.

The improved work holder construction has been used for tapping the threads in pipe fittings as large as two inch fittings with high surface cutting speeds and with extremely rapid continuous operation of the machine in the manner described.

Obviously, the work engaging jaw elements 54 and 80 from time to time may become worn and must be changed. Such change or replacement may be accomplished without disturbing the adjusted positions of the remaining parts of the work holder simply by loosening any one or more of bolts 59 or 82 as the case may be. Furthermore, various sized fittings may be clamped for being tapped by merely changing the tapping tools 4, the work engaging jaw elements 54 and 80, the slide plates 60 and magazines 11 and 12 to provide the proper sized parts for the fittings to be tapped.

The improved construction provides a two-way adjustment for each work engaging jaw element 54 or 80 without the use of a dove-tailed arrangement heretofore used for work holders for tapping machines.

Accordingly, the present invention provides a new work holder construction for tapping machines for receiving and handling in properly located positions a plurality of work pieces to be tapped simultaneously at a tapping station and overcomes prior art difficulties and solves long standing problems in the art.

In the foregoing description, certain terms have been used for brevity, clearness and understanding; but no unnecessary limitations are to be implied therefrom beyond the requirements of the prior art, because such terms are utilized for descriptive purposes herein and not for the purpose of limitation, and are intended to be broadly construed.

Moreover, the description of the improvements is by way of example, and the scope of the present invention is not limited to the exact details illustrated or to the specific construction shown.

Having now described the features, discoveries and principles of the present invention, the operation and use of a tapping machine incorporating the improvements, the characteristics of the work holder construction for a tapping machine, and the advantageous, new and useful results obtained thereby, the new and useful apparatus, combinations, sub-combinations, constructions, parts, elements, arrangements, discoveries and principles, and mechanical equivalents obvious to those skilled in the art, are set forth in the appended claims.

I claim:

1. Work holder construction for a tapping machine including slide members, front and rear carrier members each separately reciprocable on the slide members and each movable on the slide members relative to the other, means engaging the front carrier for moving the front carrier in either direction relative to the rear carrier, means engageable between the front and rear carriers for moving the carriers in unison in either direction after a predetermined movement of the front carrier relative to the rear carrier, a plurality of work engaging jaw elements mounted on each carrier, means for adjusting each jaw element on its carrier in a plurality of directions normal to the direction of carrier movement, and means for clamping each jaw element in adjusted position on its carrier.

2. Work holder construction as set forth in claim 1 in which a jaw block is pivotally mounted on the rear carrier, in which two jaw elements are mounted on said jaw block, and in which a key is provided on the rear carrier engageable in an enlarged groove formed in the jaw block for limiting the pivotal movement of the jaw block on the rear carrier.

3. Work holder construction as set forth in claim 1 in which means is provided engageable between the front and rear carriers and having adjustable stop means thereon limiting relative movement of the front carrier on the slide members in either direction with respect to the rear carrier.

4. Work holder construction as set forth in claim 1 in which adjustable stop means is provided limiting movement of the rear carrier in one direction on the slide members, and in which means is provided engageable between the front and rear carriers and having other adjustable stop means thereon limiting relative movement of the front carrier on the slide members in either direction with respect to the rear carrier.

5. Work holder construction as set forth in claim 1 in which each jaw element is provided with a slideway slidably mounted on a slide projection on its carrier, and in which the adjusting means for each jaw element includes an adjusting screw mounted on the carrier provided with an annular flange, and a depression in the jaw element communicating with said slideway engaged by said flange.

6. Work holder construction for a tapping machine including slide members, front and rear carrier members each separately reciprocable on the slide members and each movable on the slide members relative to the other, means engaging the front carrier for moving the front carrier in either direction relative to the rear carrier, means engageable between the front and rear carriers for moving the carriers in unison in either direction after a predetermined movement of the front carrier relative to the rear carrier, a rear jaw block on the rear carrier, a plurality of front jaw blocks on the front carrier, jaw adjusting blocks slidably mounted for movement in one direction on the front and rear jaw blocks, means for adjusting the relative locations of the jaw adjusting blocks with respect to the front and rear jaw blocks, a work engaging jaw element slidably mounted on each jaw adjusting block for movement in a direction angular to the direction of movement of such jaw adjusting block on its front or rear jaw block, means for adjusting each work engaging jaw element with respect to its jaw adjusting block, means for rigidly clamping in adjusted position the work engaging jaws and jaw adjusting blocks to their respective front or rear jaw blocks, and means pivotally mounting said rear jaw block on the rear carrier.

7. Work holder construction as set forth in claim 6 in which adjustable stop means is provided engageable with the rear jaw block limiting movement of the rear carrier in one direction on the slide members, and in which restraining clamp means is provided on the rear carrier engageable with the rear jaw block preventing tilting of the rear jaw block when stopped by said stop means.

8. Work holder construction as set forth in claim 6 in which rod members are mounted on the rear carrier extending through openings formed in the front carrier, and in which spaced adjustable stop members are mounted on said rod members engageable with the front carrier limiting relative movement between the front and rear carriers on the slide members in either direction.

9. Work holder construction as set forth in claim 6 in which the means for rigidly clamping the work engaging jaws and their adjusting blocks to their respective front and rear jaw blocks comprise bolt means mounted on the jaw blocks extending through apertures formed in the jaw adjusting blocks and engaged with the work engaging jaws.

References Cited in the file of this patent

UNITED STATES PATENTS

| | | |
|---|---|---|
| 21,951 | Ford | Nov. 2, 1858 |
| 1,141,305 | Berg | June 1, 1915 |
| 1,581,022 | Saylor | Apr. 13, 1926 |
| 1,862,668 | Eldredge et al. | June 14, 1932 |
| 2,402,411 | Kent | June 18, 1946 |
| 2,573,276 | Roberts | Oct. 30, 1951 |